United States Patent [19]
Raith et al.

[11] Patent Number: 5,987,019
[45] Date of Patent: Nov. 16, 1999

[54] MULTI-RATE RADIOCOMMUNICATION SYSTEMS AND TERMINALS

[75] Inventors: Alex Krister Raith, Durham; James Ragsdale, Raleigh; John Diachina, Garner, all of N.C.

[73] Assignee: Telefonaktiebolaget LM Ericsson, Stockholm, Sweden

[21] Appl. No.: 08/725,643

[22] Filed: Oct. 15, 1996

[51] Int. Cl.⁶ .................................................. H04Q 7/32
[52] U.S. Cl. ........................ 370/347; 370/442; 370/337
[58] Field of Search .................................. 370/320, 342, 370/335, 347, 441; 375/200, 206; 395/853

[56] References Cited

U.S. PATENT DOCUMENTS

| | | | |
|---|---|---|---|
| 5,177,740 | 1/1993 | Toy et al. | 370/350 |
| 5,182,753 | 1/1993 | Dahlin et al. | 371/33 |
| 5,230,003 | 7/1993 | Dent et al. | 371/43.6 |
| 5,299,235 | 3/1994 | Larsson et al. | 370/350 |
| 5,570,467 | 10/1996 | Sawyer | 455/515 |
| 5,603,081 | 2/1997 | Raith et al. | 370/329 |
| 5,757,813 | 5/1998 | Raith | 375/225 |
| 5,770,927 | 6/1998 | Abe | 375/340 |

FOREIGN PATENT DOCUMENTS

| | | |
|---|---|---|
| 399612 | 11/1990 | European Pat. Off. |
| 605312 | 7/1994 | European Pat. Off. |
| 642233 | 3/1995 | European Pat. Off. |
| WO95/01012 | 1/1995 | WIPO |
| WO96/21998 | 7/1996 | WIPO |

OTHER PUBLICATIONS

Standard European Search Report re: RS 98399 Date of completion of search: May 16, 1997.

*Primary Examiner*—Chi H. Pham
*Assistant Examiner*—Frank Duong
*Attorney, Agent, or Firm*—Burns, Doane, Swecker & Mathis, L.L.P.

[57] ABSTRACT

Variances in bandwidth used by a radiocommunication connection are adapted to by changing the type of information being transmitted. For example, in a TDMA environment, a first downlink time slot associated with a double- or triple-rate connection may have a first format, while a second time slot associated with the same connection may have a second format different from the first format. Bandwidth in the second (or third) time slot can be used to carry information in a fast out-of-band channel (FOC). The FOC may provide information relating to the same connection as the payload or data field in that time slot, e.g., a service type identifier which informs the mobile or base station of the type of information (e.g., voice, video or data) being conveyed in the payload. Alternatively, the FOC information may be associated with a connection or connections which are different from that supported by the payload or data field containing the FOC.

33 Claims, 8 Drawing Sheets

| SLOT 1 | SYNC | SACCH | DATA | CDVCC | DATA | CDL |
|---|---|---|---|---|---|---|

| SLOT 2 | SYNC | FOC | DATA | FOC | DATA | FOC |
|---|---|---|---|---|---|---|

| SLOT 3 | SYNC | FOC | DATA | FOC | DATA | FOC |
|---|---|---|---|---|---|---|

FIG. 6

| SLOT 1 | SYNC | SACCH | DATA | CDVCC | DATA | CDL |
|---|---|---|---|---|---|---|

| SLOT 2 | SYNC | FOC | DATA | FOC | DATA | FOC |
|---|---|---|---|---|---|---|

| SLOT 3 | SYNC | FOC | DATA | FOC | DATA | FOC |
|---|---|---|---|---|---|---|

FIG. 7A

| SLOT 1 | SYNC | SACCH | DATA | CDVCC | DATA | CDL |
|---|---|---|---|---|---|---|

| SLOT 2 | SYNC | FOC | DATA | FOC | DATA | CDL |
|---|---|---|---|---|---|---|

| SLOT 3 | SYNC | FOC | DATA | FOC | DATA | CDL |
|---|---|---|---|---|---|---|

FIG. 7B

| SLOT 1 | SYNC | SACCH | DATA | CDVCC | DATA | CDL |
|---|---|---|---|---|---|---|

| SLOT 2 | SYNC | FOC | DATA | CDVCC | DATA | CDL |
|---|---|---|---|---|---|---|

| SLOT 3 | SYNC | FOC | DATA | CDVCC | DATA | CDL |
|---|---|---|---|---|---|---|

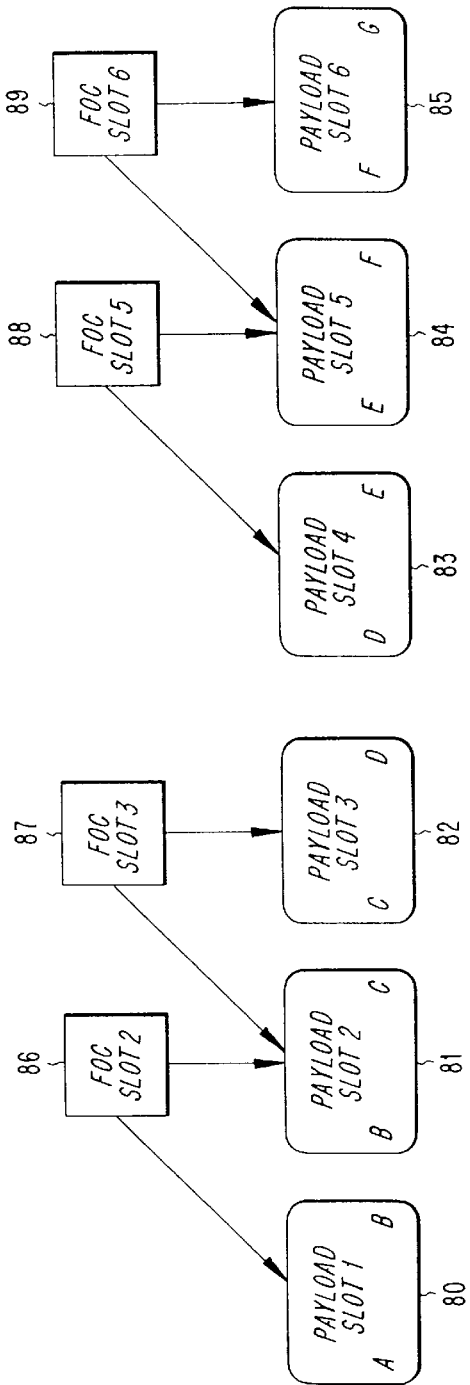
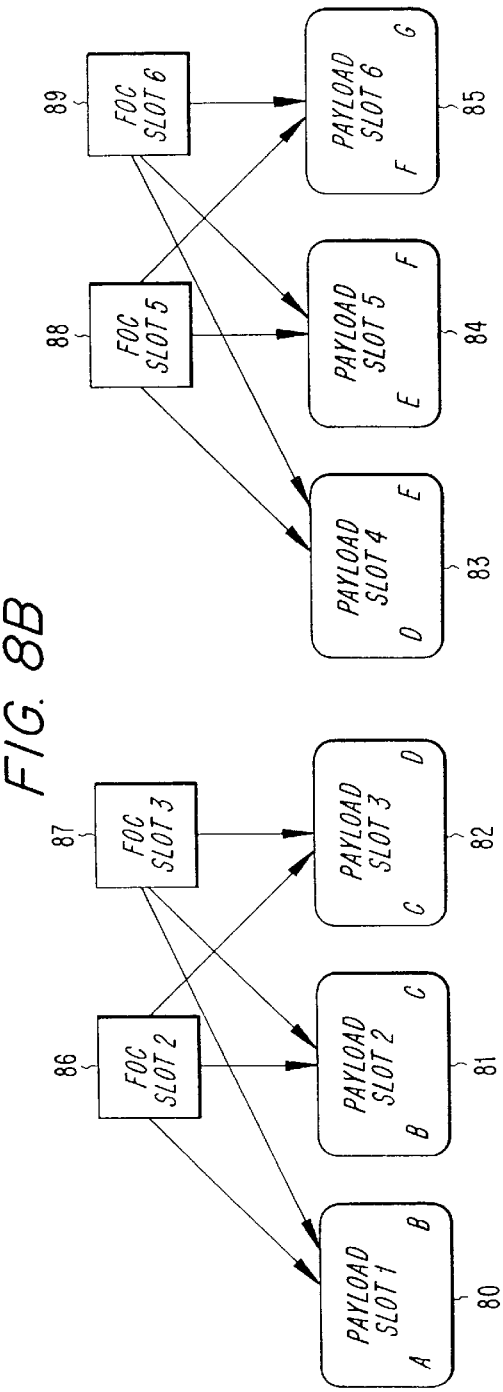

MULTI-RATE RADIOCOMMUNICATION SYSTEMS AND TERMINALS

RELATED APPLICATION

This application is related to U.S. patent application Ser. No. 08/730,360 entitled "Radiocommunication Systems and Terminals with Increased Payload Bandwidth", which application was filed on the same date as this application.

BACKGROUND

Applicant's invention relates generally to radiocommunication systems, e.g., cellular or satellite systems, that use digital traffic channels in a multiple access scheme, e.g., time division multiple access (TDMA) or code division multiple access (CDMA).

The growth of commercial radiocommunications and, in particular, the explosive growth of cellular radiotelephone systems have compelled system designers to search for ways to increase system capacity without reducing communication quality beyond consumer tolerance thresholds. One way to increase capacity is to use digital communication and multiple access techniques such as TDMA, in which several users are assigned respective time slots on a single radio carrier frequency.

In North America, these features are currently provided by a digital cellular radiotelephone system called the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVC) and TDMA digital traffic channels (DTC), and the system operator can dynamically replace one type with the other to accommodate fluctuating traffic patterns among analog and digital users. The AVCs and DTCs are implemented by frequency modulating radio carrier signals, which have frequencies near 800 megahertz (MH) such that each radio channel has a spectral width of 30 kilohertz (KHz). A subsequent standard, referred to as IS-136, adds specifications for digital control channels. This standard document, in particular the version identified as PN-3474.1, dated Dec. 15, 1995 and published by EIA/TIA, is incorporated here by reference.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. According to IS-54B and IS-136, each TDMA frame consists of six consecutive time slots and has a duration of 40 milliseconds (msec). Thus, each frame can carry from one to six traffic channels (e.g., one to six radio connections). The number of connections which can be supported by each TDMA frame depends on the desired information transmission rate. For example, if the connections are used to support the transmission of voice information, the number of slots used per channel depends on the source rates of the speech coder/decoders (codecs) used to digitally encode the conversations. Such speech codecs can operate at either full-rate or half-rate, with full-rate codecs being expected to be used until half-rate codecs that produce acceptable speech quality are developed.

Thus, a full-rate DTC requires twice as many time slots in a given time period as a half-rate DTC, and in IS-54B, each radio channel can carry up to three full-rate DTCs or up to six half-rate DTCs. Each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output, and the remaining bits are used for guard times and overhead signalling for purposes such as synchronization.

In addition to voice information being transmitted on the traffic channels, various other types of data can and will be transmitted thereon. For example, facsimile (fax) transmissions are commonly supported by radiocommunication systems. Similarly, packet data transmissions, which divide information streams into packets rather than providing dedicated (i.e., "connection-oriented") channels for each information stream, will be supported in radiocommunication systems. Other types of information transmission, e.g., video or hybrid voice, data and video to support internet connections, will likely be supported in the future.

These various types of information communication (also referred to herein as different "services") will likely have different optimal transmission characteristics. For example, services between a remote user and the internet may benefit by providing a greater bandwidth in the downlink (i.e., from the internet to the remote station) than in the uplink, since many users spend a significant portion of their connection time downloading information from the internet rather than uploading thereto. Thus, it may be desirable in such cases to allocate a triple rate connection in the downlink (e.g., all six time slots of an IS-136 TDMA frame) but only a full rate connection in the uplink (e.g., two time slots of an IS-136 frame). This inequality between uplink and downlink bandwidth is referred to herein as an "asymmetrical" connection. In addition to bandwidth considerations, other transmission characteristics may also be impacted. For example, different services may require different degrees of error protection. Thus, for example, an optimal channel coding for the transmission of voice information might be rate 1/2 since voice information transmission is typically not provided with a procedure for retransmission, while optimal channel coding for the transmission of data, e.g, facsimile, might be rate 5/6 since retransmission procedures are typically provided. Other transmission characteristics, for example, the ability to tolerate delay in the reception of information, may also vary between services. All of these differences in transmission characteristics should be considered together when determining an optimal specification for the air interface.

Accordingly, it would be desirable to provide techniques for transmitting information between remote stations and the system in radiocommunication networks that provide sufficient flexibility for the anticipated variety of information communication services described above, while also providing sufficient compatibility with existing technology so that equipment used by the existing consumer base will not become obsolete.

SUMMARY

According to exemplary embodiments of the present invention, the type of information transmitted in the uplink or downlink may vary depending upon the transmission rate. For example, in a TDMA environment, a first downlink time slot associated with a double- or triple-rate connection may have a first format, while a second time slot associated with the same connection may have a second format different from the first format. The different formats take into account the need to transmit certain types of information at only full rate, and not double- or triple-rate.

According to some exemplary embodiments, bandwidth in the second (or third) time slot can be used to carry information in a fast out-of-band channel (FOC). The FOC may provide information relating to the same connection as the payload or data field in that time slot, e.g., a service type identifier which informs the mobile or base station of the type of information (e.g., voice, video or data) being conveyed in the payload. This information can be used by the receiving equipment to aid in processing the information conveyed in the payload, e.g., by knowing the channel coding rate. These exemplary embodiments find particular application to multimedia communications where the type of payload may vary rapidly, e.g., on a slot-by-slot basis, or even within each slot.

Various exemplary mapping techniques for associating the FOC information with each time slot or each block of data which may be interleaved over two or more time slots are also described herein. These exemplary mapping techniques also account for the fact that there may not be FOC information provided in each time slot.

According to other exemplary embodiments of the present invention, the FOC information may be associated with a connection or connection which is different from that supported by the payload or data field containing the FOC. For example, in asymmetrical connections, e.g., where a mobile station transmits in a different number of slots per frame than it receives, a downlink channel may carry payload to a first mobile station in the data fields in several time slots of a frame but the FOC may provide control information to one or more other mobile stations which are not interested in the payload. All of these mobile stations may share the same frequency on the uplink, e.g., the one or more other mobile stations may transmit packet data and use the FOC to receive retransmission requests.

BRIEF DESCRIPTION OF THE DRAWINGS

The features and advantages of Applicants' invention will be understood by reading this description in conjunction with the drawings, in which:

FIG. 6 illustrates downlink time slot formats according to a first exemplary embodiment of the present invention;

FIG. 7A illustrates downlink time slot formats according to a second exemplary embodiment of the present invention;

FIG. 7B illustrates downlink time slot formats according to a third exemplary embodiment of the present invention;

FIGS. 8A–8C illustrate exemplary mappings of FOC information to payload according to various exemplary embodiments of the present invention;

DETAILED DESCRIPTION

The following description is scripted in terms of a cellular radiotelephone system, but it will be understood that Applicant's invention is not limited to that environment. Also, the following description is in the context of TDMA cellular communication systems, but it will be understood by those skilled in the art that the present invention may apply to hybrid access methodologies, e.g,. those including TDMA and Code Division Multiple Access (CDMA).

Figure 1:
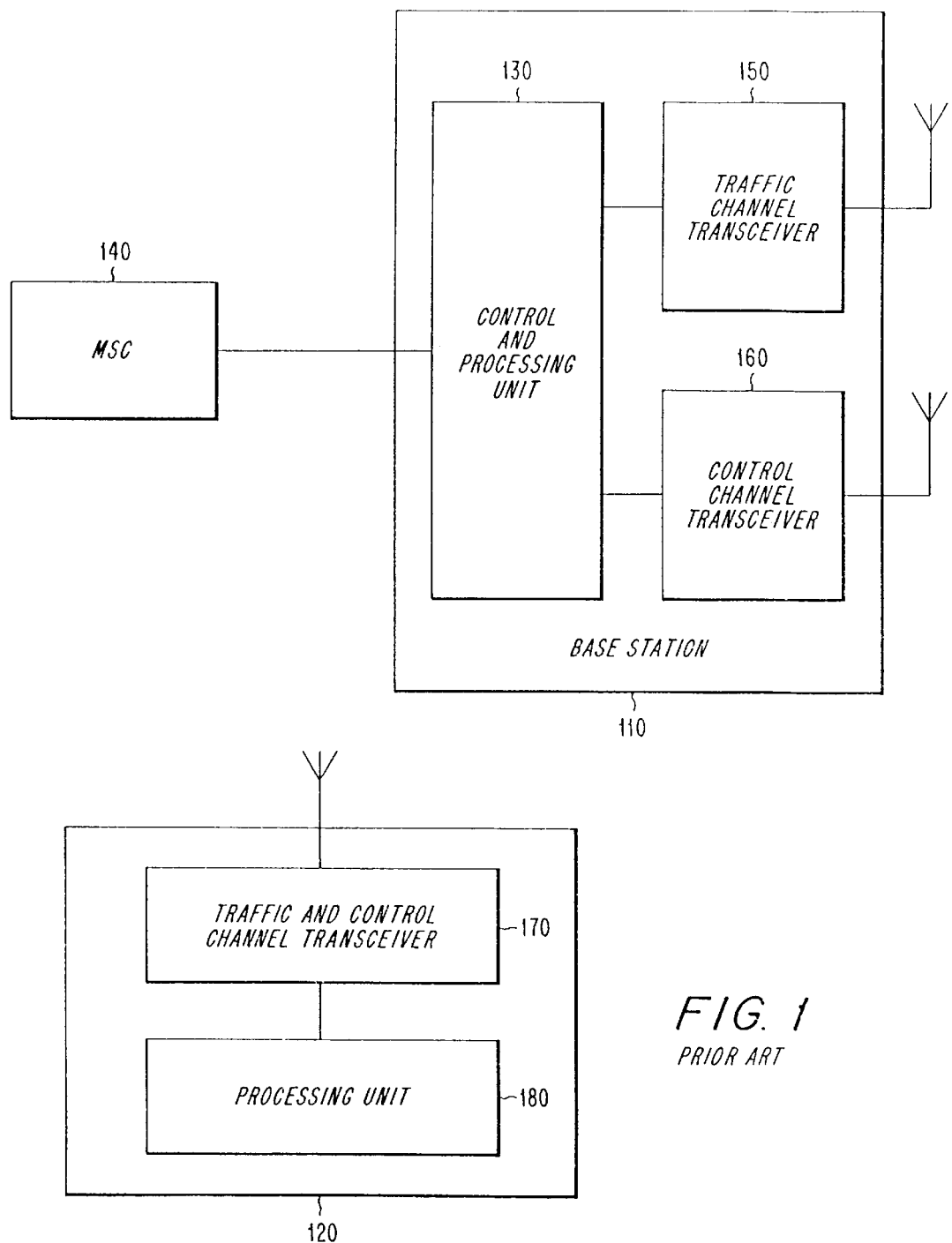
FIG. 1 is a block diagram of an exemplary cellular radio telephone system in which the present invention may be applied.

FIG. 1 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by the above-cited U.S. patent applications and by U.S. Pat. No. 5,175,867 to Wejke et al., entitled "Neighbor-Assisted Handoff in a Cellular Communication System," and U.S. patent application Ser. No. 07/967,027 entitled "Multi-Mode Signal Processing," which was filed on Oct. 27, 1992, both of which are incorporated in this application by reference.

The base station 110 handles a plurality of traffic channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170 in the mobile station, for use with control channels and traffic channels that share the same radio carrier frequency.

The traffic channels can be used in a dedicated, connection-oriented manner to transmit information, e.g., for a voice connection, where each channel is used continuously for a period of time to support transmission of a single stream of information or in a packet-oriented manner where each channel can be used to send independent units of information associated with different information streams. When used in the former sense, control channels and traffic channels will be referred to herein as DCCHs and DTCs, respectively. When used in the latter sense, control channels and traffic channels will be referred to herein as PCCHs or PDTCs, respectively. For more information regarding packet data radiocommunication systems generally, the interested reader is referred to U.S. patent application Ser. No. 08/544,836, entitled "Packet Channel Feedback", filed on Oct. 18, 1995, the disclosure of which is expressly incorporated here by reference.

After an idle mobile station 120 has located a control channel, e.g., by using digital control channel location information found on a traffic channel, it can then read the control information transmitted on that control channel, e.g., paging messages, using its traffic and control channel transceiver 170. Then, the processing unit 180 evaluates the received control channel information, which may include, for example, paging messages or requests to measure signals strengths on identified channels. When a connection between the mobile station 120 and the system is desired, the transceiver 170 will tune to an appropriate traffic channel as described below.

Figure 2:
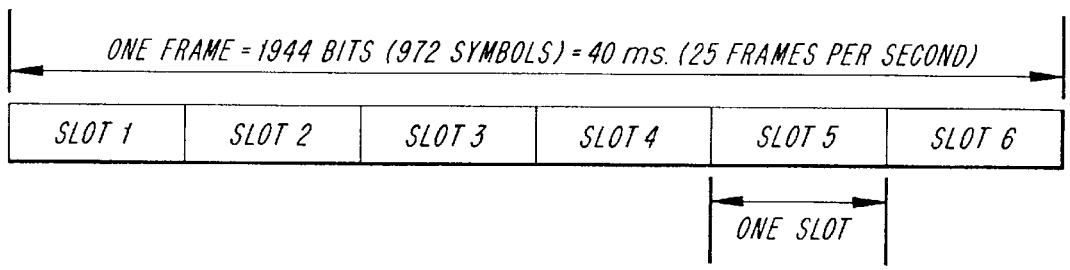
FIG. 2 illustrates an exemplary TDMA frame structure.

An exemplary organization of the information transmitted on each radio channel, i.e., the channel bursts, or time slots, in accordance with Applicant's invention is shown in FIG. 2. The consecutive time slots on a radio channel are organized in TDMA frames of, for example, six slots each so that a plurality of distinct channels can be supported by a single radio carrier frequency. Each TDMA frame in this example has a duration of 40 msec and supports six half-rate logical channels, three full-rate logical channels, or greater bandwidth channels as indicated in the following table. Each slot can, for example, have a duration of 6.67 msec and carry 324 bits (162 symbols), which have positions in each slot that are conventionally consecutively numbered 1–324.

| Number of Slots | Used Slots | Rate |
| --- | --- | --- |
| 1 | 1 | half |
| 2 | 1,4 | full |
| 4 | 1,4,2,5 | double |
| 6 | 1,4,2,5,3,6 | triple |

Figure 3:
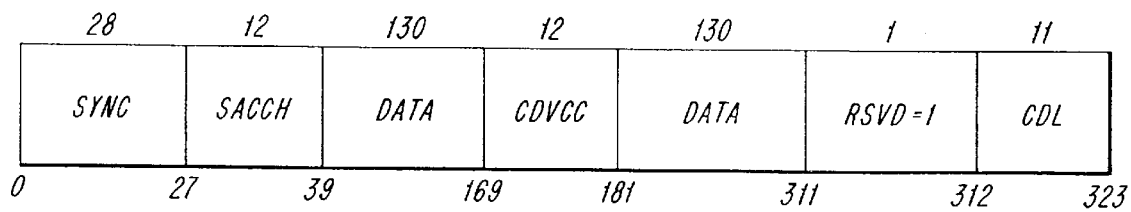
FIG. 3 illustrates a conventional downlink traffic channel time slot format.

Currently, IS-136 defines a downlink DTC slot format as illustrated in FIG. 3. Therein, the numbers above each field denote the number of bits associated therewith. For example, the SYNC field is used for synchronization equalizer training and time slot identification. The SACCH (Slow Associated Control Channel) is a signalling channel used, for example, for transmission of control and supervision messages between the mobile station and the base station. The two DATA fields are used to transmit the "payload" of the slot, e.g., user information or control channel information as part of the FACCH (Fast Associated Control Channel). The CDVCC (Coded Digital Verification Color Code) is a cell identifier that identifies the base station which is transmitting to the mobile station. The CDL (Coded Digital Control Channel Locator) is a pointer which can be used to indicate on which frequency, or set of frequencies, a digital control channel is likely to be found. Conventionally, this downlink format is used for each time slot in a TDMA frame, i.e., all six time slots for systems operating according to IS-136. According to the present invention, however, it may be desirable to provide alternative slot formats to accommodate the different communication services provided above.

Figure 4A:
FIG. 4A illustrates triple rate downlink frame usage.
Figure 4B:
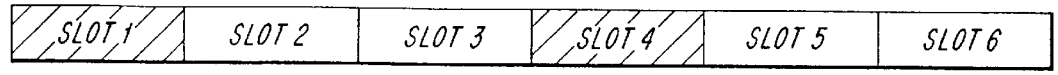
FIG. 4B illustrates full rate uplink frame usage.

Consider again the situation where it is desirable to provide a triple rate connection in the downlink (i.e., base-to-mobile direction) and a full rate connection in the uplink (i.e., mobile-to-base direction). This situation is shown in FIGS. 4A and 4B. Therein, FIG. 4A illustrates a downlink frame wherein all six time slots are allocated to a particular mobile, as denoted by the cross-hatching of each of time slots 1–6. FIG. 4B illustrates a corresponding uplink frame. Note that only slots 1 and 4 are allocated to the particular mobile station which is using all of the time slots of FIG. 4A. Thus, the remaining time slots 2, 3, 5 and 6 are unallocated and, conventionally, would go unused.

Figure 5:
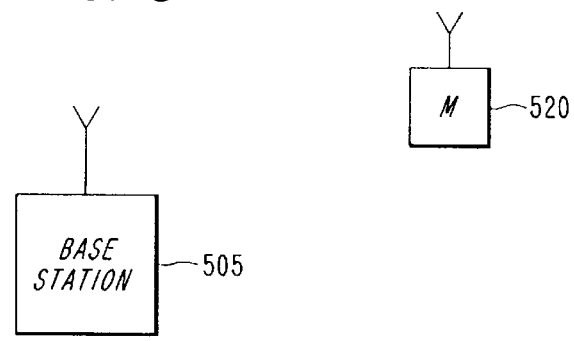
FIG. 5 illustrates a base station and three mobile stations communicating therewith.
Figure 5:
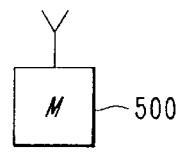
Figure 5:
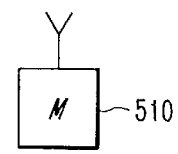

Bandwidth being a precious commodity, exemplary embodiments of the present invention provide techniques for using unallocated bandwidth in a single link without adversely impacting compatibility with existing air interface specifications, e.g., IS-136. According to a first exemplary embodiment described below, the unused uplink time slots can be used to send packet data. Packet data communications support independent usage of uplink and downlink frequencies. Accordingly, packet data can be sent on the unused time slots in the uplink from one or more other mobile stations to the base station. Consider FIG. 5. Therein, mobile station 500 is allocated the downlink and uplink time slots illustrated in FIG. 4A and 4B for communicating with base station 505. To fully utilize the bandwidth resources according to the present invention, another mobile station 510 transmits packet data to base station 505 in a PDTC comprising time slots 2 and 5 of FIG. 4B, while a third mobile station 520 transmits packet data to base station 505 on a PDTC comprising time slots 3 and 6.

If either of the mobile stations 510 and 520 require downlink bandwidth, then a downlink channel may be assigned on some other frequency, since mobile station 500 is using all of the time slots of the frequency represented by FIG. 4A. Alternatively, it may be the case that, for a particular time period during a packet data connection which is referred to herein as an "activity burst", one or both mobile stations 510 and 520 only need to transmit packet data and, therefore, do not require downlink bandwidth for the purposes of receiving packet data. Nonetheless, mobile stations 510 and 520 will still need to receive overhead information from base station 505, e.g., relating to which packets were not received and whether each mobile station is allowed to transmit in a particular frame. Assigning a downlink PDTC purely for the transmission of such overhead information is spectrally inefficient. One solution would be to provide this overhead information to mobiles 510 and 520 on a PCCH and require the mobile stations to return to the PCCH periodically, e.g., after transmitting packets on the PDTC during the activity burst which lasts, for example, one second.

However, according to exemplary embodiments of the present invention, another technique for providing overhead information to mobile stations 510 and 520 using one or more downlink time slots whose data or "payload" fields are being used to transmit information to mobile station 500. Specifically, the downlink time slot format illustrated in FIG. 3 can be altered to (1) provide overhead information regarding packet data communications to mobile stations 510 and 520, without (2) significantly altering mobile station 500's ability to receive triple rate downlink information. FIG. 6 illustrates downlink time slot formats according to this exemplary embodiment of the present invention.

Therein, three downlink slot formats are illustrated for an exemplary traffic channel according to the present invention. These three slot formats might correspond, for example, to slots 1, 2 and 3 of FIG. 4A. Slots 4, 5 and 6 would have the same format as slots 1, 2 and 3, respectively for this exemplary embodiment. Unlike conventional systems, e.g., those currently specified by IS-136, the downlink formats illustrated in FIG. 6 differ within the frame. Specifically, while time slot 1 has the same slot format as conventional downlink traffic time slots (see, e.g., FIG. 3), time slots 2 and 3 differ in that the SACCH, CDVCC and CDL fields of slot 1 have each been replaced by an FOC (fast out-of-band channel) field. It will be noted that, for the purposes of simplicity, the RSVD bit illustrated in FIG. 3 has been omitted. However, this bit may also be reserved and included in downlink slot formats according to the present invention.

In the example described above, mobile station 500 is using a triple rate downlink connection, i.e., it is reading the data fields of each of time slots 1, 2 and 3 in FIG. 6. However, some of the other fields provided in the conventional downlink time slot format of FIG. 3 need not be transmitted in each time slot under these circumstances. For example, the type of overhead signalling that occurs on the SACCH is such that mobile station 500 need not receive the SACCH at triple rate. That is, mobile station 500 may only need to receive one SACCH burst every three time slots. Thus the field that is normally used for SACCH information in slots 2 and 3 can be replaced by FOC information according to the present invention. The CDVCC field includes information that aids in the identification of the radio link and is conventionally used for radio link control, e.g., tearing down of a connection. However, this information can be provided to the mobile station over the control channel at call-setup and, accordingly, need not be transmitted by the base station in each downlink time slot. Various techniques are described below to avoid problems caused by omitting the CDL information from some downlink time slots.

Omitting these fields in time slots 2 and 3 (as well as 5 and 6) provides an opportunity to inform the other mobile stations, e.g., mobile stations 510 and 520, of information pertaining to their uplink connections, without assigning a new PDTC or forcing mobile stations 510 and 520 to revert periodically to listening to the PCCH. For example, the FOC fields can be used to inform mobile station 510 or mobile station 520 that a previously transmitted packet was not properly received and should be retransmitted. Note that since the FOC information is "out-of-band" (i.e., is not encoded as part of the data), mobile stations 510 and 520 advantageously need not be aware of the channel coding and interleaving needed to read the data fields in time slots 2 and 3.

Many variations of the foregoing exemplary embodiment are possible and contemplated by the present invention. For example, although the foregoing example is provided in terms of an asymmetrical connection wherein the downlink is triple rate and the uplink is full rate, any asymmetrical connection lends itself to application of the present invention. For example, the downlink may be double rate and the uplink full rate, whereupon the FOC fields would replace the SACCH, CDVCC and CDL fields in only one of slots 2 and 3 illustrated in FIG. 6.

Moreover, it may not be desirable to replace all three of the SACCH, CDVCC and CDL fields with FOC information. For example, it may be determined that 36 bits of FOC information is not needed. Alternatively, for compatibility reasons, it may be determined that one or more of the SACCH, CDVCC and CDL fields should be maintained in each downlink slot. Thus, for example, downlink slot formats for the triple rate downlink/full rate uplink example provided above could instead be as illustrated in one of FIGS. 7A and 7B. Therein, the FOC replaces only the SACCH and CDVCC in FIG. 7A and only the SACCH in FIG. 7B. Those skilled in the art will appreciate that many more variations exist, such as time slot 2 or 3 being the "master" channel having the conventional slot format of FIG. 3 instead of slot 1.

As mentioned above, exemplary embodiments of the present invention wherein the base station 505 only transmits the CDVCC and/or the CDL in some downlink slots of a traffic channel may cause difficulties for mobile stations that expect this information in all time slots on a downlink traffic channel. For extensive information relating to the CDL and mobile functionality relating to locating digital traffic channels, the reader is referred to U.S. patent application Ser. No. 08/331,711 entitled "Method and Apparatus for Locating a Digital Control Channel in a Radiocommunication System", filed on Oct. 31, 1994, the disclosure of which is incorporated here by reference. In brief, the CDL field is used by unconnected mobile stations (e.g., at powerup) to locate a control channel if the first channel to which it tunes is a traffic channel. According to one exemplary technique, a mobile station reads the field corresponding to the CDVCC in the time slot to which it first tunes on a frequency. This conventional mobile station will identify this field as either a CDVCC (implying a traffic channel per the format of FIG. 3) or a coded superframe phase (CSFP) (implying a control channel per IS-136). If a traffic channel, the mobile station will then use the CDL information as a pointer to search another channel number, or set of channel numbers, for a control channel.

Thus, if the CDVCC information is replaced by FOC information on some downlink time slots, a conventional mobile station reading this field for the purpose of identifying the channel as either a control channel or a traffic channel may misidentify a traffic channel as a control channel. Alternatively, the mobile station might read the FOC information as valid CDVCC data (thus correctly identifying the channel as a traffic channel) and then look for the CDL, which is not present (thus moving to an incorrect channel number or set to search).

Both of these problems can be avoided according to exemplary embodiments of the present invention by recognizing that both the CSFP and the CDVCC according to IS-136 are (12,8) encoded data words, i.e., 8 bits of data encoded to 12 bits that have particular characteristics. Specifically, the CDVCC is a (12,8) code word that remains the same in each time slot associated with a particular channel and has non-inverted checkbits, while the CSFP is a (12,8) code word that has inverted checkbits and acts as an upcounter. Since the universe of (12,8) codewords having these characteristics is relatively small as compared with the number of total number of 12 bit binary words, the FOC information can be made distinct from the CDVCC and CSFP to avoid confusion. Specifically, the base station can transmit FOC information in the field which conventionally been used in downlink channels as either the CSFP or the CDVCC (i.e., bits 169–181 in FIG. 3), which is carefully tailored to avoid similarity with a (12,8) codeword having these characteristics by adding filler bits to distinguish therefrom as will be readily appreciated by those skilled in the art.

Of course, those mobile stations (or other receiving equipment) which are designed with the present invention in mind will be aware that the SACCH, CDVCC and CDL information can be located at a pre-defined full-rate portion of a multi-rate channel, which pre-defined portion is referred to herein as the "master channel". The master channel may, as in the afore-described examples, be transmitted on time slots 1 and 4, or alternatively on time slots 2 and 5 or 3 and 6. In any case, a mobile station which has been suitably programmed to be aware of master channels can simply tune to a master channel to find CDL information.

The present invention also has application in situations other than asymmetrical data/packet data situations described above. For example, in order to ensure complete compatibility, and for ease of implementation, it may be desirable to adopt the downlink slot format of slot 2 in FIG. 6 for situations in which packet data is transmitted in both the uplink and downlink, i.e., for uplink and downlink PDTCs as well as downlink DTCs and uplink PDTCs. That is, base stations according to the present invention which transmit packet data traffic channels can use this downlink format for transmitting to mobile stations. Moreover, this aspect of the present invention is also applicable to situations wherein the connection is not asymmetrical.

Another area in which the present invention finds application is in multimedia communication. As described above, it is anticipated that future radio communications will need to support intermingled voice, data and video service, wherein the type of information to be transmitted may vary rapidly, e.g., time slot by time slot and wherein the different services may require different levels of channel coding. One technique for dealing with this type of situation is to use call control signalling (e.g., over the FACCH) to identify which type of instantaneous service is to be supported over the channel. Another alternative is simply to allow the base station to transmit information pertaining to different services on a slot-by-slot basis, and require the mobile station to discriminate between the different services based on the differences in channel coding. See, for example, U.S. Pat. No. 5,230,003 to Dent and Raith, the disclosure of which is expressly incorporated here by reference. This procedure is currently used to determine whether FACCH information or voice information is carried in the DATA field of a particular downlink time slot. However, as the number of services expands beyond two, the complexity of discriminating between services in this manner becomes excessive.

Thus, according to another exemplary embodiment of the present invention, the FOC fields may also serve the purpose of service type identifier. In this embodiment, the FOC can provide information regarding the type of service which the associated payload is currently supporting, the channel coding and/or interleaving associated therewith. For example, in a multimedia connection information transfer may rapidly vary between voice, data and video information. In such a case, a change in the FOC can inform the mobile station of the type of information being transmitted, so that the mobile station will know how to process the received information, e.g., how to decode the received bits. As will be apparent from reviewing FIG. 6, FIG. 7A and FIG. 7B, exemplary embodiments of the present invention do not provide FOC fields in each time slot received by the mobile station in order to maintain full-rate transmission of SACCH, CDVCC and CDL. That is, using again IS-136 as an illustrative example, a mobile station receiving data at triple-rate will read FOC information in time slots 2, 3, 5, and 6, but not slots 1 and 4. Thus, it is desirable to provide a mapping between the FOC information received in time slots 2, 3, 5, and 6 and the information payload received by the mobile station in all six time slots.

More specifically, exemplary embodiments of the present invention provide a service type indicator for each block of information transmitted to the mobile station. These blocks of information are commonly referred to as "Layer 2 frames" which include, for example, speech frames associated with voice connections and radio link protocol (RLP) frames associated with data, e.g., fax, connections. Layer 2 frames, which are thus contained within the DATA fields of one or more downlink time slots, should not, however be confused with TDMA frames, which consist of a plurality of time slots. The number of time slots in which each Layer 2 frame is contained will vary depending upon the size of the Layer 2 frames and the amount of interleaving associated with a particular system.

For the purposes of illustration, the exemplary mappings provided below are described in the context of interleaving over two time slots, i.e., each Layer 2 frame is spread over two time slots. However, those skilled in the art will appreciate that Layer 2 frames could be interleaved over more than two time slots in which case the mappings described below would also change accordingly.

Figure 8C:
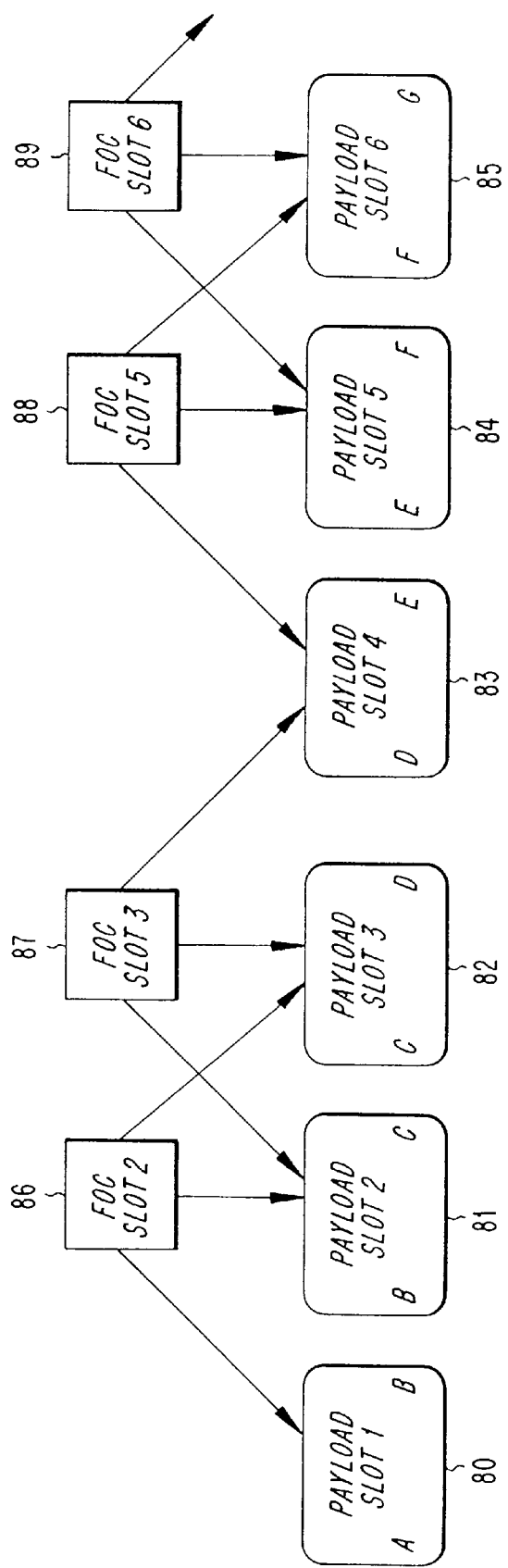

Several exemplary associations between the FOC information and the Layer 2 frames for a triple-rate connection are illustrated in FIGS. 8A–8C. Therein, the six larger blocks 80–85 refer to the payload portion of each of the six time slots in a TDMA frame. For example, as shown in any of FIGS. 6, 7A and 7B, the payload portion includes the information contained in both DATA fields of a time slot. Within each payload portion parts of two Layer 2 frames are carried, as denoted by the letters A–G. As seen in FIGS. 8A–8C, each Layer 2 frame in this example is interleaved over two time slots. Above the six payload portions are the four FOC portions 86–89 which are contained in slots 2, 3, 5 and 6, respectively. For example, each FOC portion 86 could, for example, be 36 bits as shown in the exemplary embodiment of FIG. 6, 24 bits as shown in the exemplary embodiment of FIG. 7A or 12 bits as shown in the exemplary embodiment of FIG. 7B.

The arrows in each of FIGS. 8A–8C denote the mapping between the bits in each FOC portion and Layer 2 frames in each time slot. In particular, an arrow from an FOC portion 86–89 drawn to a time slot 80–85 implies that the FOC portion includes bits which identify the service type of the Layer 2 frame which begins in that time slot. For example, in FIG. 8A, the arrow leading from FOC SLOT 2 block 86 to PAYLOAD SLOT 1 block 80, indicates that some of the bits contained in the FOC field(s) of slot two are used to convey an identification of the service type of Layer 2 frame B to the recipient equipment (mobile or base station). Thus, according to the exemplary mapping of FIG. 8A, Layer 2 frame C has bits in both FOC blocks 86 and 87 relating to an indication of its service identity, while Layer 2 frames B and D have identifying bits only in one of blocks 86 and 87, respectively.

The way in which the identifier bits are divided between FOC 86 and FOC 87 can vary. For example, a straightforward approach might be to include the complete identifier for Layer 2 frame B, redundancy associated with that identifier, the complete identifier for Layer 2 frame C and redundancy associated with that identifier in FOC 86. At the same time FOC 87 would include, the complete identifier for Layer 2 frame C, redundancy associated with that identifier, the complete identifier for Layer 2 frame D and redundancy associated with that identifier. As will be appreciated by those skilled in the art, redundancy is provided to allow for correction of errors created during transmission of the bits over the air interface. For ease of reference, this division of bits is referred to using the following notation:

FOC 86 includes: Ib, R{Ib}, Ic, R{Ic}

FOC 87 includes: Ic, R{Ic}, Id, R{Id} wherein, for example, "Ib" refers to the identifier information associated with Layer 2 frame B and "R{Ib}" refers to the redundancy provided for identifier information associated with Layer 2 frame B.

This exemplary division of bits provides two complete identifiers for Layer 2 frame C, implying unequal redundancy, i.e., less redundancy for Layer 2 frames B and D. Another possible division of identifier bits, using the same notation above (and noting that division by 2 implies simply half of the bits associated with that information), would be:

FOC 86 includes: Ib, R{Ib}, (Ic, R{Ic})/2

FOC 87 includes: (Ic, R{Ic})/2, Id, R{Id}

Using this exemplary division of bits, equal redundancy is achieved. Similar comments and bit divisions apply to FOC 88 and 89 with respect to identifying the service types of Layer 2 frames E, F and G.

FIG. 8B illustrates another exemplary mapping according to the present invention. Therein, like reference numerals are used to refer to like bits as described with respect to FIG. 8A. The only differences between FIG. 8B and FIG. 8A are that an additional arrow connects FOC block 86 to the payload of slot 3 and that an additional arrow connects FOC block 87 to the payload of slot 1 (analogous additional arrows are associated with FOC blocks 88 and 89 as well). As discussed above, this means that according to the exemplary mapping of FIG. 8B, bits in FOC blocks 86 and 87 are also provided which relate to the service identity of the Layer 2 frames B and D, respectively. Accordingly, an exemplary bit division between FOC blocks 86 and 87 (as well as 88 and 89 but for Layer 2 frames E, F and G) is as follows:

FOC 86 includes: (Ib, R{Ib})/2, (Ic, R{Ic})/2, (Id, R{Id})/2

FOC 87 includes: (Ib, R{Ib})/2, (Ic, R{Ic})/2, (Id, R{Id})/2

This exemplary embodiment provides an equal amount of redundancy for each Layer 2 frame service type indicator, as well as time slot interleaving of all indicators. However, the receiver will need to wait longer than in the aforedescribed embodiment to take advantage of all of the redundancy.

A third exemplary mapping is illustrated in FIG. 8C. Therein, like reference numerals are used to refer to like bits as described with respect to FIGS. 8A and 8B. The only differences between FIG. 8C and FIG. 8B are that an arrow connects FOC block 87 to the payload of slot 4 (instead of slot 1 in FIG. 8B). Similarly, FOC block 89 has an arrow which points to the first time slot in the next TDMA frame. As discussed above, this means that according to the exemplary mapping of FIG. 8C, bits in FOC block 87 are also provided which relate to the service identity of the Layer 2 frame E. Accordingly, an exemplary bit division between FOC blocks 86 and 87 (as well as 88 and 89 but for Layer 2 frames E, F, G and A) is as follows:

FOC 86 includes: Ib, R{Ib}, Ic, R{Ic}, Id, R{Id}

FOC 87 includes: Ic, R{Ic}, Id, R{Id}, Ie, R{Ie}

This exemplary embodiment has less delay involved in decoding the identifier information than the exemplary embodiment of FIG. 8B since, e.g., all of the identifier information for Layer 2 frame B will have been received by time slot 2. Those skilled in the art will readily appreciate that other mappings are possible and are considered to be within the scope of the present invention.

As described above, the FOC can be used in the downlink in different ways. Specifically, if a mobile station is assigned to an asymmetrical data connection, then the FOC is not associated with the connection and may be used in the manner described above to provide feedback relating to one or more uplink packet data connections. Alternatively, if the mobile station is assigned a multimedia connection, then the FOC can instead serve as a signalling channel associated with the connection that provides out-of-band information regarding the connection itself. In the former case, the mobile station which is receiving, for example, at double- or triple-rate need not read the FOC since the information provided therein relates to a connection associated with another mobile station. In the latter case, the mobile station needs to read the FOC since its information pertains to the mobile station's connection. At call set-up or handoff, the mobile station can be informed, e.g., as part of the channel assignment message, which type of connection is being set-up. If, for example, the mobile station is informed that a non-multimedia (e.g., an asymmetrical data) connection is being set-up, then that mobile station will know that it should ignore the FOC information.

Figure 9:
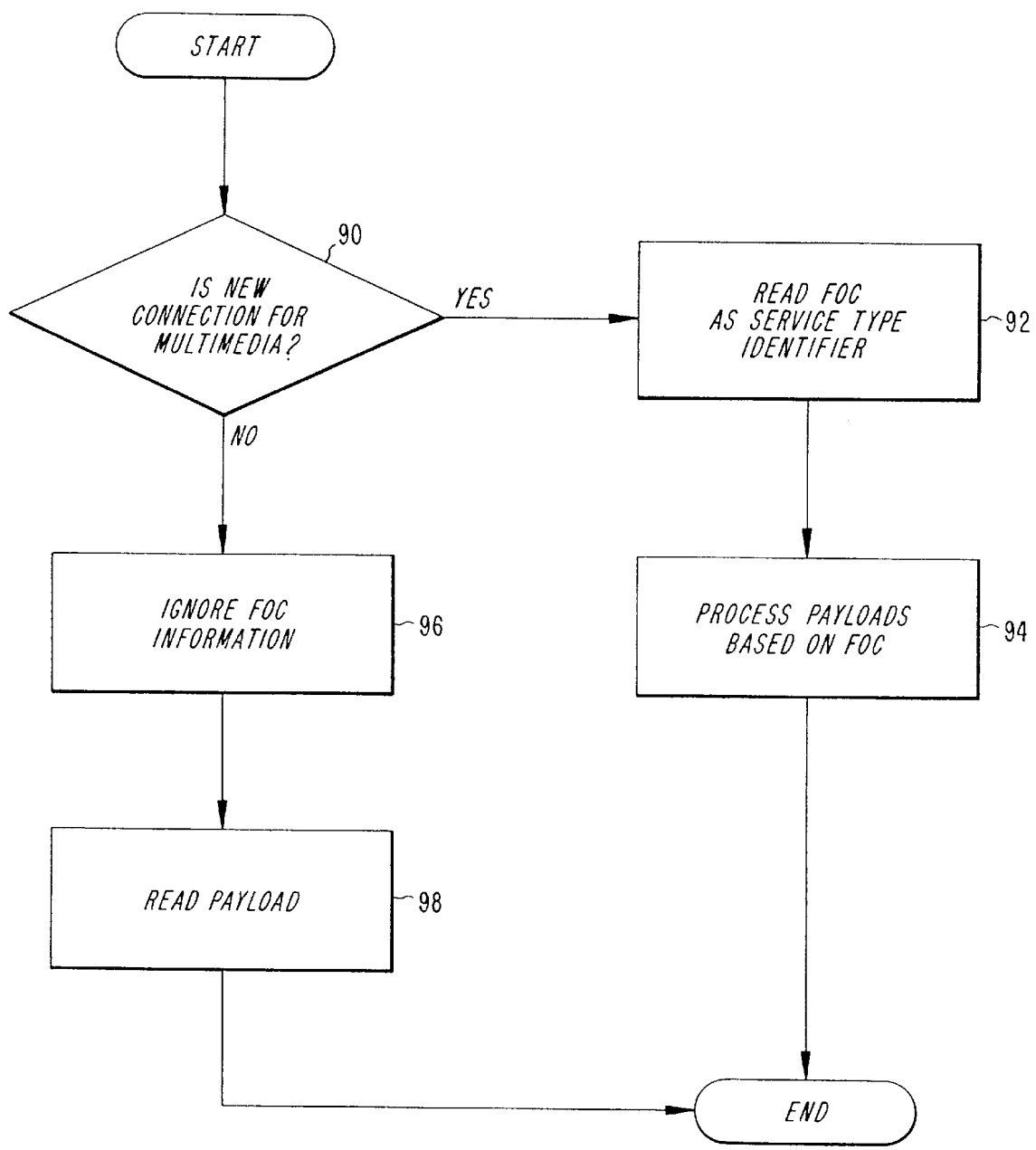
FIG. 9 is a flowchart illustrating an exemplary, alternative usage of an FOC field by a mobile station according to the present invention.

This handling of the FOC by a mobile station is illustrated in the flow chart of FIG. 9. Therein, at decision block 90, the mobile station determines whether the new (greater than full-rate) connection is a multimedia connection. If so, then the flow proceeds to block 92, wherein the mobile station recognizes that because the connection is multimedia, the FOC provides instantaneous service type information for that mobile station's downlink connection and should be read. The mobile then proceeds to use the FOC information in processing the payload at block 94.

If the connection is not a multimedia connection, e.g., it is an asymmetrical data/fax connection wherein the mobile will be receiving at double- or triple-rate, then the flow follows the "No" branch leaving decision block 92. Thus, the mobile station will then recognize at block 96 that the FOC fields in some of the downlink time slots should be ignored since that information is used to provide feedback to other mobile stations regarding their uplink connections. Note, block 96 is not meant to imply that all mobile stations would ignore the FOC, only the mobile station receiving the double- or triple-rate downlink information on that frequency. This mobile station will then read the payload of the slots associated with the additional bandwidth, while ignoring the FOC fields at block 98.

To this point, the discussion has focused on adjustments which can be made to transmission formats in the downlink. However, there may also be situations where the mobile station transmits in more time slots in each frame than it receives. Thus, it is desirable to optimize the uplink traffic channel format for these situations as well.

Figure 10:
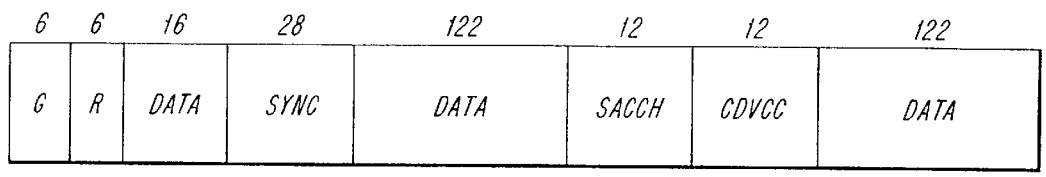
FIG. 10 is a conventional format for all uplink traffic channel time slots.

FIG. 10 illustrates a conventional uplink traffic channel format as currently specified by IS-136. Therein, the bit sizes of each field are specified by the numbers above each field. Similarly identified fields, including DATA, SYNC, CDVCC, and SACCH, are used in the manner described above with respect to the conventional downlink traffic channel format of FIG. 3. Guard time field (G) and ramp time field (R) are provided to provide the base station some time between received time slots from different mobiles and to avoid spectral splatter. Unlike the downlink, the uplink has no CDL field since the base station has no need of such information.

Figure 11:
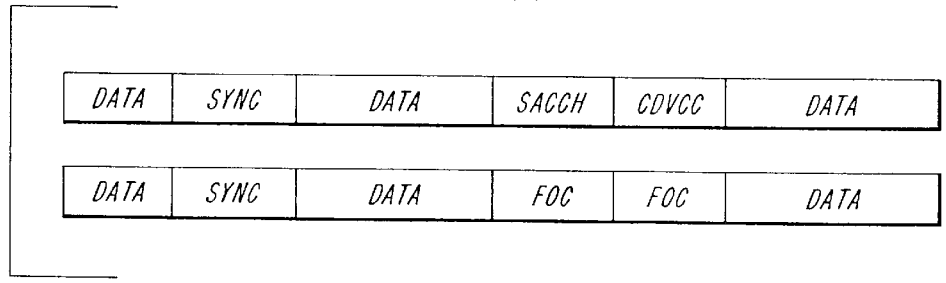
FIG. 11 is an exemplary format for two or more uplink traffic channel time slots according to an exemplary embodiment of the present invention.

However, the base station need not receive SACCH and/or CDVCC information in each uplink time slot when connected at greater than full rate to a mobile station. Thus, according to exemplary embodiments of the present invention, one or both of these fields can be filled with FOC information in a manner analogous to that described for the downlink. Accordingly, an exemplary uplink format according to the present invention may be as illustrated in FIG. 11. Therein, for double-rate transmission in the uplink, the slot format for the first (and fourth) slot in an exemplary six slot frame system will be as shown in the top row, while the format for the second (and fifth) slot will be as shown on the bottom. For triple-rate transmission in the uplink the third and sixth slots will have the same format as shown in the bottom row of FIG. 11. Thus, for example, 24 bits of FOC information per time slot can be provided in the uplink to, for example, identify the service type of the payload being transmitted by the mobile station. As in the exemplary embodiments for the downlink, it may be desirable to maintain one of the SACCH or the CDVCC in additional time slots, in which case FOC information may be provided only in one of the two fields shown in the bottom row of FIG. 11.

It is, of course, possible to embody the invention in specific forms other than those described above without departing from the spirit of the invention. The embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method for transmitting information on a traffic channel to a first remote station comprising the steps of:
   grouping the information into a plurality of successive time slots on a radio carrier signal;
   grouping a plurality of said successive time slots into a frame;
   providing a first field starting at a predetermined bit position in at least one of said successive time slots within said frame, said first field containing a first type of control channel information;
   providing a second field starting at said same predetermined bit position in at least another one of said successive time slots within said frame, said second field containing a different type of information than said first type of information; and
   transmitting said frame to said first remote station.

2. The method of claim 1, wherein said first type of control channel information is slow associated control channel (SACCH) information.

3. The method of claim 1, wherein said first type of control channel information is coded digital verification color code (CDVCC) information.

4. The method of claim 1, wherein said first type of control channel information is coded digital locator (CDL) information.

5. The method of claim 2, wherein said predetermined bit position is bit number 27 in a 324 bit time slot.

6. The method of claim 3, wherein said predetermined bit position is bit number 169 in a 324 bit time slot.

7. The method of claim 4, wherein said predetermined bit position is bit number 312 in a 324 bit time slot.

8. The method of claim 2, wherein said predetermined bit position is a next bit after a synchronization field.

9. The method of claim 3, wherein said predetermined bit position is a next bit after a data field.

10. The method of claim 4, wherein said predetermined bit position is a next bit after a data field.

11. The method of claim 1, wherein said different type of information is feedback information associated with an uplink connection involving a second remote station.

12. The method of claim 1, wherein said different type of information is service type identifier information associated with information transmitted on said traffic channel.

13. The method of claim 1, wherein said at least one of said successive time slots within said frame is a first time slot.

14. A method for transmitting information between a first communication terminal and a radiocommunication system and a second communication terminal and said radiocommunication system comprising the steps of:
   providing an uplink connection for transmitting uplink information from said first and second communication terminals to said radiocommunication system, wherein said uplink information is disposed in at least one predetermined, uplink information field;
   providing a downlink connection, associated with said uplink connection, for transmitting downlink information from said radiocommunication system to said first communication terminal, wherein said downlink information is disposed in at least one predetermined downlink information field and wherein said uplink and downlink connections together comprise a duplex radio channel;
   transmitting information asymmetrically on said duplex radio channel wherein a bandwidth associated with said first communication terminal's usage of said uplink connection differs from a bandwidth associated with said first communication terminal's usage of said downlink connection; and
   transmitting another field on said downlink connection that provides information to said second communication terminal relating to its uplink connection.

15. The method of claim 14, wherein said radio channel comprises a plurality of time slots on a pair of radio frequencies.

16. The method of claim 14, wherein said radio channel comprises at least one spreading code used to spread said uplink and downlink information.

17. The method of claim 14, wherein said downlink information is voice information.

18. The method of claim 14, wherein said uplink information is packet data.

19. A method for transmitting information on a radio channel between a first communication terminal and a radiocommunication system comprising the steps of:
   providing at least one first field in which payload information is disposed;
   providing at least one second field, separate from said first field, which includes a service type identifier which identifies a type of payload information provided in said at least one first field; and
   transmitting said at least one first field and said at least one second field on said radio channel.

20. The method of claim 19, wherein said radio channel comprises a plurality of time slots on a pair of radio frequencies.

21. The method of claim 19, wherein said radio channel comprises at least one spreading code used to spread said uplink and downlink information.

22. The method of claim 19, further comprising the step of:
   changing said type of information from a first type to a second type during a connection between said communication terminal and said system; and
   adjusting a value of said service type identifier to correspond to the second type of information.

23. The method of claim 22, wherein said first type of information is one of video, voice and data and said second type of information is different one of video, voice and data.

24. The method of claim 19, wherein said information is multimedia information.

25. The method of claim 19 further comprising the step of:
   mapping said service type identifier onto said at least one first field.

26. A method for transmitting information to a communication station comprising the steps of:
   establishing a connection between a base station and said communication station, including informing the communication station of whether the type of connection being established is a multimedia connection or a non-multimedia connection; and
   transmitting the information to said communication station over said established connection.

27. The method of claim 26, wherein said step of establishing occurs at call-setup.

28. The method of claim 27, wherein said step of establishing occurs at call handoff.

29. The method of claim 27, wherein a multimedia connection is a connection wherein a service type identifier is transmitted via said connection.

30. The method of claim 27, wherein a non-multimedia connection is a connection wherein control information associated with at least one other communication station is transmitted via said connection.

31. A method for receiving information in a radiocommunication system comprising the steps of: receiving connection information which identifies a connection as one of multimedia or non-multimedia;

reading, if said connection is identified as a multimedia connection, a predetermined field of information which has been received; and otherwise, if said connection is identified as a non-multimedia connection, ignoring said predetermined field of information.

32. The method of claim 31, wherein said predetermined field contains service type identifier information if said connection is identified as a multimedia connection.

33. The method of claim 31, wherein said predetermined field contains control information associated with a different connection if said connection is identified as a non-multimedia connection.

\* \* \* \* \*